United States Patent
Crandall et al.

(10) Patent No.: US 7,873,069 B2
(45) Date of Patent: Jan. 18, 2011

(54) METHODS AND APPARATUS FOR CONTROLLING AUDIO CHARACTERISTICS OF NETWORKED VOICE COMMUNICATIONS DEVICES

(75) Inventors: Mark A. Crandall, Belford, NJ (US); Emil F. Stefanacci, Freehold, NJ (US); John J. Jetzt, Lincroft, NJ (US); Prakash C. Khanduri, Freehold, NJ (US); Michael D. Lange, Wall, NJ (US)

(73) Assignee: Avaya Inc., Basking Ridge, NJ (US)

( * ) Notice: Subject to any disclaimer, the term of this patent is extended or adjusted under 35 U.S.C. 154(b) by 937 days.

(21) Appl. No.: 11/685,092

(22) Filed: Mar. 12, 2007

(65) Prior Publication Data

US 2008/0225884 A1 Sep. 18, 2008

(51) Int. Cl.
*H04J 3/24* (2006.01)
(52) U.S. Cl. .................. 370/464; 84/625; 330/279; 379/387.02; 381/94.1; 381/103; 381/315; 704/500
(58) Field of Classification Search ............... 348/239; 358/468; 370/464; 379/387.02; 382/321; 707/204, 821; 715/705; 716/13; 718/102; 719/310; 725/47; 700/94; 704/200.1, 500; 84/625; 330/279; 381/94.1, 103, 315
See application file for complete search history.

(56) References Cited

U.S. PATENT DOCUMENTS

| | | | | |
|---|---|---|---|---|
| 4,392,114 A * | 7/1983 | Yamada et al. | ............. | 333/28 T |
| 4,644,292 A * | 2/1987 | Kunugi et al. | ............... | 330/279 |
| 5,146,507 A * | 9/1992 | Satoh et al. | .................. | 381/103 |
| 6,732,372 B2 * | 5/2004 | Tomita et al. | .................. | 725/47 |
| 7,120,910 B2 * | 10/2006 | Matsuda et al. | ............. | 718/102 |
| 7,277,766 B1 * | 10/2007 | Khan et al. | .................... | 700/94 |
| 7,366,733 B2 * | 4/2008 | Matsumi et al. | ............. | 707/821 |
| 7,461,175 B2 * | 12/2008 | Ono et al. | .................... | 719/310 |
| 7,570,842 B2 * | 8/2009 | Suenaga et al. | ............. | 382/321 |
| 2003/0121401 A1 * | 7/2003 | Ito | .............................. | 84/625 |
| 2004/0004665 A1 * | 1/2004 | Kashiwa | ..................... | 348/239 |
| 2004/0215447 A1 * | 10/2004 | Sundareson | .............. | 704/200.1 |
| 2006/0188116 A1 * | 8/2006 | Frerking et al. | ............. | 381/315 |
| 2006/0293771 A1 * | 12/2006 | Tazine et al. | .................. | 700/94 |
| 2007/0019825 A1 * | 1/2007 | Marumoto et al. | ......... | 381/94.1 |
| 2007/0067751 A1 * | 3/2007 | Seno | ........................... | 716/13 |
| 2007/0209002 A1 * | 9/2007 | Terada et al. | ................ | 715/705 |
| 2007/0253035 A1 * | 11/2007 | Takesada | .................... | 358/468 |
| 2007/0282613 A1 * | 12/2007 | Diethorn | ..................... | 704/500 |
| 2008/0082594 A1 * | 4/2008 | Soltes et al. | ................ | 707/204 |

* cited by examiner

*Primary Examiner*—Gerald Gauthier
(74) *Attorney, Agent, or Firm*—Muncy, Geissler, Olds & Lowe PLLC

(57) ABSTRACT

Methods and apparatus for controlling the audio characteristics of a networked voice communications device (NVCD) are presented. One method presented includes receiving a settings file, extracting at least one audio control parameter from the settings file, deriving audio processing parameters based upon a value selected from the at least one audio control parameter, and controlling the audio characteristics of the networked voice communications device using the audio processing parameters and the at least one audio control parameter. A method for providing audio parameters to an NVCD is also presented which includes establishing a settings file, which includes at least one audio control parameter, receiving a request to send the settings file, and sending the settings file over a network to the networked voice communications device.

29 Claims, 6 Drawing Sheets

US 7,873,069 B2

METHODS AND APPARATUS FOR CONTROLLING AUDIO CHARACTERISTICS OF NETWORKED VOICE COMMUNICATIONS DEVICES

BACKGROUND OF THE INVENTION

1. Field of the Invention

Embodiments of the invention generally relate to the configuration of networked voice communications devices (NVCD), and more particularly, controlling the audio characteristics thereof. Specifically, various embodiments are directed to the networked control of audio characteristics of Voice over Internet Protocol (VoIP) telephones.

2. Description of the Background Art

Advances in reliability, performance, and cost effectiveness of packet-switched networks are motivating a transition to utilize such networks for communications traditionally carried over switched-circuit telephone networks. This trend can be readily appreciated in the area of voice communications, where Voice over Internet Protocol (VoIP) telephony is being used to supplement, and in some cases, replace, telephone networks based upon the Public Switched Telephone Network (PSTN).

The flexible nature of packet switched networking can permit VoIP telephones to have a high degree of flexibility for configuration, customization, and administration. Through the implementation of operational software, VoIP telephone functionality may be tailored in a wide variety of ways. For example, network settings, specific user preferences (e.g., preferred language, dialing rules, voice-mail preferences, display attributes, etc.), and/or settings based upon the VoIP telephone's environment may be altered by changing its operational software.

Because a VoIP telephone can be deployed in many types of environments, it may be desirable to adjust the audio parameters of the VoIP telephone for the environment in which it is placed. For example, even within a single network, VoIP telephones may be placed in surroundings having widely varying acoustic properties, such as, for example, call centers, reception areas, offices having various sizes and decor, and/or other types of areas. By altering the operational software, one or more audio parameters may be changed to optimize both the transmit and receive sound quality of the VoIP telephone.

Altering the operational software of the VoIP telephone conventionally involves having a software developer or engineer actually modify the operational software source code to adjust the hard-coded audio parameters, compiling and/or linking the operational software to place it in executable form, and transferring the executable code to the VoIP telephone. The compiling and linking operations may be referred to as "rebuilding" the software. The modification of the operational source code and/or the transfer of the executable code to the VoIP telephone may be performed by at a centralized server, by a technician or administrator, which may download the executable code to the VoIP telephone via a network.

However, modifying the actual operational software to customize the audio characteristics of the VoIP telephone may be a time consuming and thus costly process. This effort may be compounded as it can take several iterations of changing the operational software and testing the targeted VoIP telephone in its environment to optimize its audio characteristics to the user's satisfaction. Moreover, altering the operational software can present additional risks of inadvertently introducing "bugs" into the operational software. Such risks may likely increase proportionally with the number of times the software is modified, and with the number of people involved in making the modifications.

Accordingly, it would be beneficial for methods and apparatus to allow the customization of the audio characteristics of VoIP telephones for a wide variety of operational environments in an efficient and economical manner.

SUMMARY OF THE EMBODIMENTS

Various embodiments of the invention are presented herein which can address the abovementioned issues associated with the existing technology. Embodiments consistent with the present invention are directed to methods and apparatus for controlling audio characteristics of networked voice communications devices.

An embodiment which is a method for setting the audio parameters of a networked voice communications device is presented. The method includes receiving a settings file, extracting at least one audio control parameter from the settings file, deriving audio processing parameters based upon a value selected from the at least one audio control parameter, and controlling the audio characteristics of the networked voice communications device using the audio processing parameters and the at least one audio control parameter.

Another embodiment which is a method for providing audio parameters to a networked voice communications device is presented. The method includes establishing a settings file which includes at least one audio control parameter, receiving a request to send the settings file, and sending the settings file over a network to the networked voice communications device.

An embodiment directed to a networked voice communication device having audio characteristics configured by a settings file is also presented. The apparatus includes a processor, and memory, functionally coupled to the processor, having executable instructions for causing the processor to receive the settings file, extract at least one audio control parameter from the settings file, derive audio processing parameters based upon a value selected from the at least one audio control parameter, and control the audio characteristics of the networked voice communications device using the audio processing parameters and the at least one audio control parameter.

BRIEF DESCRIPTION OF THE DRAWINGS

Further aspects and advantages of the present invention will become apparent upon reading the following detailed description taken in conjunction with the accompanying drawings summarized below.

DETAILED DESCRIPTION

Embodiments consistent with the present invention are more specifically set forth in the following description with reference to the appended figures. Wherever possible, the same reference numbers will be used throughout the drawings to refer to the same or like parts.

Figure 1:
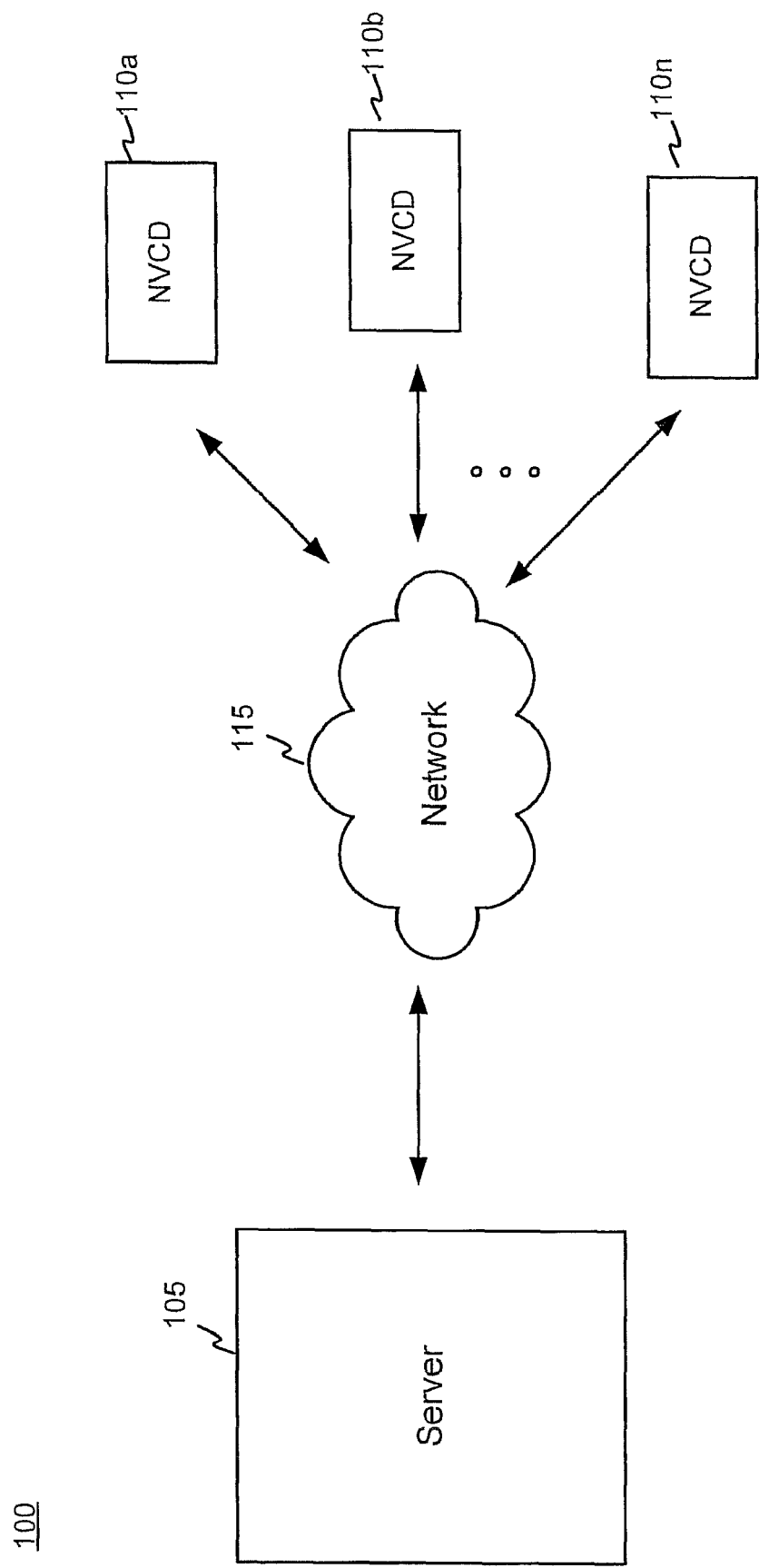
FIG. 1 shows a top-level system diagram of an exemplary networked voice communications system.

FIG. 1 shows a top-level system diagram of an exemplary networked voice communications system (NVCS) 100 consistent with an embodiment of the invention. The NVCS 100 may include a server 105 which is functionally coupled to a network 115. A plurality of Networked Voice Communications Devices (NVCDs) 110a-110n may also be functionally coupled to the network 115, and may communicate with the server 105. The server 105 may organize and route voice and/or other communications over the network 115 originating from one or more of the NVCDs 110a-110n. Additionally, the server 105 may also connect to private and/or public data communication and/or standard PSTN telephone networks (not shown), either directly and/or through network 115.

The NVCDs 110a-110n may be any combination of voice transceivers which are known in the art that provide a voice communication capability to users through network 115. Various embodiments may include commercially available VoIP telephones, such as, for example, Avaya 46xx or 96xx units. Details of an exemplary NVCD are further presented below in the description of FIG. 2. Server 105 may be any commercially available computer known to one of ordinary skill in the art (e.g., server-class machines built using X86 based processors manufactured by Intel or AMD), or may be purpose-built specialized machines tailored to voice communication tasks, or any combination thereof. Details of an exemplary server 105 are further presented below in the description of FIG. 3. Network 115 may be a switched packet network, such as, for example, Ethernet based networks using TCP/IP, ATM networks, the Internet, and/or other data communication networks known to one of ordinary skill in the art.

The server 105 may perform various administration, configuration and/or maintenance functions associated with the NVCDs 110a-110n, which may be performed over the network 115. Configuration and administration of the NVCDs 110a-110n can be accomplished utilizing software running on the server 105. Such software may include commercially available versions, such as, for example, Avaya Communication Manager, and/or other such software-based tools known in the art, which may allow the centralization of call processing and administration through a single machine.

One administrative function of server 105 may include developing, altering, and/or providing operational software to one or more of the NCVDs 110a-110n. The operational software may initially start out as source code which may be human readable text. An example of the source code(s) may utilize the C++, C, and/or assembly programming languages, or any other such non-interpreted programming languages known in the art. The source code may then be transformed by a compiling and/or linking process into an executable form of instructions which may be directly utilized by the NVCDs 110a-110n. The executable form of instructions is defined herein as the operational software, and may be downloaded to the NVCDs upon initialization. The operational software may not be directly readable by humans. The operational software may dictate the behavior and various aspects of the functionality of the NVCDs 110a-110n, and may work in conjunction with a settings file 210 (described in detail in the explanation of FIG. 2) to alter the functionally of one or more of the NVCDs 110a-110n in order to better customize it for the end user.

The settings file 210 is a file which may be created and/or modified at the server 105, or at another computer, and can be provided to an NVCD through the network 115, or though some other fixed media (e.g., compact disk, CF or SD cards, or some other form of non-volatile memory, etc.). The settings file may contain audio control parameters which can be modified to optimize both the transmit and receive sound quality of an NVCD for most any given environment in which it is placed.

One of ordinary skill in the art would appreciate that environmental conditions may have a significant impact on how sound is perceived. Room size, layout, material of construction, and the amount and type of furnishings provided within the room, as well as other conditions, such as the number of people residing therein, can affect echo, background noise, frequency characteristics, etc. which may impact the perceived sound quality for both the transmitting and receiving parties associated with an NVCD. As NVCDs 110a-110n may be placed in a wide variety of environments, it may be desirable to have the ability to quickly adjust the audio characteristics to optimize the quality of the user's audio experience for most any placement situation. The utilization of the audio control parameters within the settings file, along with the operational software residing with an NVCD, allows such optimization.

The settings file 210 may also contain a wide variety of other parameters which may customize various aspects of the NVCDs 110a-110n to improve the user's experience. Such parameters may include variables affecting an NVCDs language, local dialing rules, backup/restore settings, various network parameters, etc. Details of the settings file are further presented below in the description of FIG. 2.

Unlike the operational software, the settings file 210 does not have to be rebuilt to be utilized by the NVCDs 110a-110n. Therefore, the amount of time to alter the audio performance characteristics of the NVCDs 110a-110n may be reduced, as preparing a new settings file 210 takes less time than preparing a new version of the operational software. Moreover, because the settings file 210 may utilize less storage space, it may be more easily transferred to an NVCD, either over a network and/or using a physical storage media. Additionally, using the settings file 210 to alter the audio control parameters obviates the need for a new operational software release to modify audio characteristics of the NVCDs 110a-110n, which may reduce the frequency of new software releases. Various embodiments of the invention may also permit the commonality of operational software across diverse operating environments in the NVCS 100, and provide the ability to easily service the diverse needs of various users.

Figure 2:
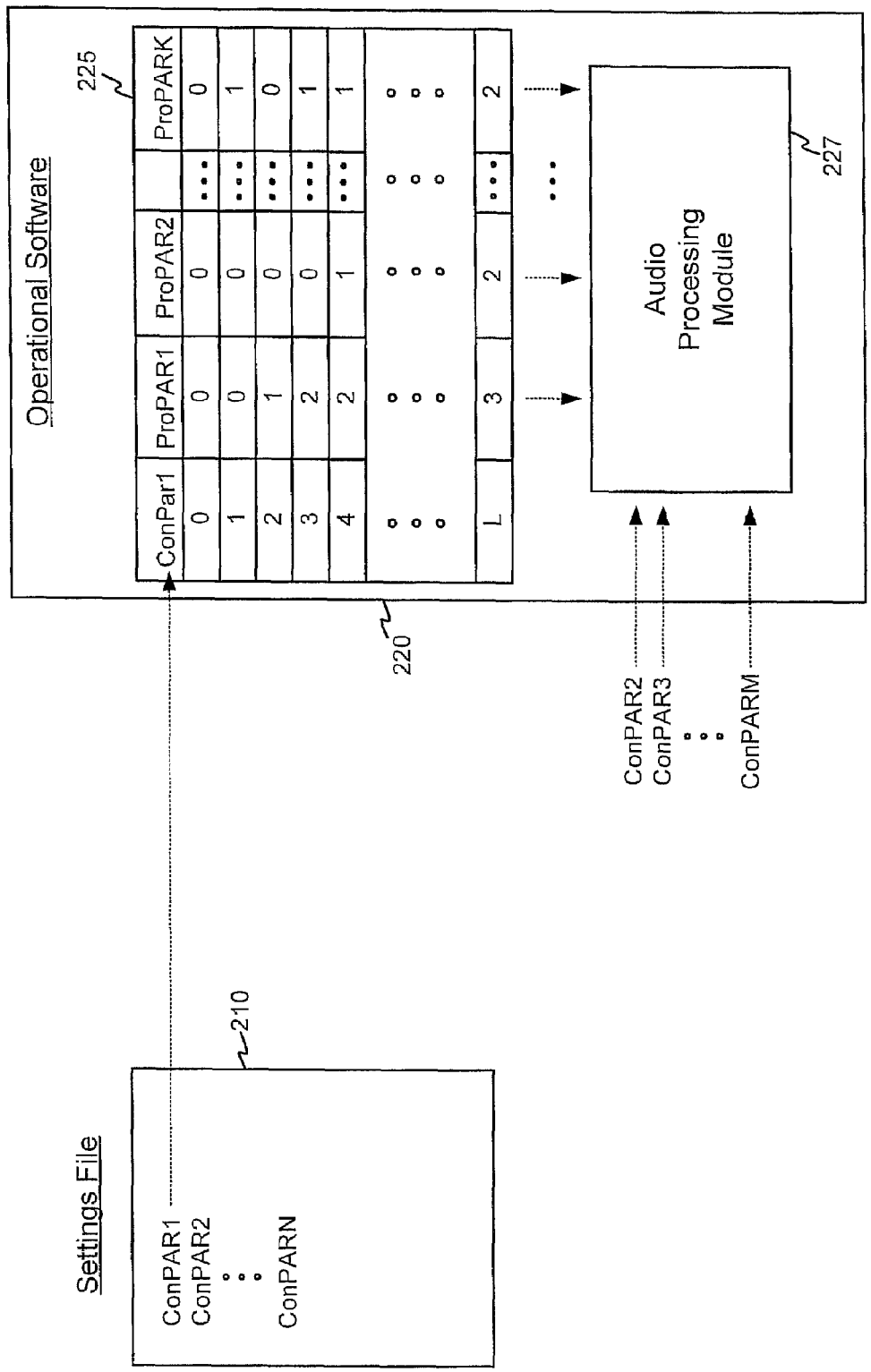
FIG. 2 illustrates a diagram representing the content and format of an exemplary settings file and audio processing parameter matrix.

FIG. 2 illustrates a diagram representing the content and format of an exemplary settings file and audio processing parameter matrix consistent with at least one embodiment of the invention. The settings file 210 is a human readable file which may contain alphanumeric text. For example, the settings file 210 may be an ASCII flat file. The settings file 210 may take the form of a script or a data file. A script may be a programming language which can be interpreted and may be typed by a user directly from a keyboard. Scripts may remain in their original text form for use on their target device and be interpreted line-by-line by processors within the NVCDs 110a-110n each time the scripts are executed. In other embodiments, the script may be sent to the NVCD and be compiled thereon by the target device itself. In either case, it is the human readable file which is provided to the NVCDS 110a-110n.

The settings file 210 may also take the form of a data file which may not contain any program instructions which can be interpreted or compiled; but may contain data which can be used in conjunction with the operational software 220, and/or with other binary programs or scripts.

The operational software 220 may be used to control the functions and features of the NVCDs. One of ordinary skill in the art would appreciate that it is not necessarily a requirement that all of the NVCDs 110a-110n be running the same version of the operational software; however, utilizing the same version of the operational software may ease maintenance and configuration tasks, and improve the stability of the NVCDs 110a-110n and ultimately the entire NVCS 100. The operational software 220 may start out as source code which may be one or more text files in human readable form. It may then be transformed into executable form by being compiled and/or linked into an executable binary version. The transformed, executable code is defined herein as the operational software 220, which is provided to one or more of the NVCDs 110a-110n for execution on their internal processors.

One of ordinary skill in the art would appreciate that settings file 210, whether a script or data file, is transferred to the NVCDs 110a-110n in a human readable form; the operational software 220 is transferred to the NVCDs 110a-110n in a form which is not human readable.

Settings file 210 contains one or more audio control parameters ConPAR1-ConPARn. These parameters are used in various ways by the operational software 220. In one embodiment, some audio control parameters ConPAR2-ConPARm may be directly used by one or more audio processing algorithms to improve the transmit and/or receive communications of the NVCDs 110a-110n. The audio processing algorithms may be known to one of ordinary skilled in the art, and are denoted in FIG. 2 as one functional block called the audio processing module 227 for ease of explanation. The audio processing module may be contained within the operational software 220, or may reside in some other program stored in the memory of NVCDs 110a-110n. One of ordinary skill in the art would appreciate that various embodiments of the invention may have the audio processing algorithms dispersed over a number of different software modules.

Another plurality of audio related parameters associated with an embodiment of the invention are audio processing parameters ProPar1-ProParK, which may be organized into a data structure 225 and can be hard-coded into the operational software 220. The audio processing parameters may be derived from the value of one or more audio control parameters. Once the audio processing parameters are determined, they may also be provided to the audio processing module 227 to improve the transmit and/or receive communications of the NVCDs 110a-110n. A combination of audio processing parameters may be selected to optimize the perceived audio quality for a characteristic audio environment.

In one or more embodiments consistent with the invention, the audio processing parameters ProPar1-ProParK may be organized into a tabular or matrix style data structure 225. An audio control parameter ConPar1 may be used to index into the data structure 225 to select K audio processing parameters ProPar1-ProParK for use in the audio processing module 227. One of ordinary skill in the art would appreciate that data structure 225 is not restricted to a two-dimensional matrix form, and could be a multidimensional data structure which may select audio processing parameters based upon a plurality of audio control parameters. Moreover, other embodiments of the invention may utilize functional representations and/or mathematical models to derive the audio processing parameters from the audio control parameters.

The audio processing parameters can be used to improve the perceived quality of the audio based upon the environment in which the NVCD is placed, and/or based upon other various aspects of the hardware and/or software which may be included in the NVCD, the network 115, and/or other devices which communicate with a given NVCD. Examples of audio processing parameters which may be utilized in the audio signal processing algorithms may include:

1. Receive Automatic Gain Control (AGC) Dynamic Range: may represent a value which limits the range for which gain may be applied in an AGC circuit to received signals. The parameter may take on discrete values which map to different range parameters (e.g., values 0, 1, 2, 3 may map to +/−9 dB, +/−12 dB, +/−15 dB, +/−18 dB of AGC dynamic range; a default parameter may be 0 which corresponds to +/−9 dB).
2. Transmit Expansion Threshold for Headset: This parameter may represent the noise floor for audio amplitude received through an NVCD headset, which may be below the level for ordinary speech. Audio signals below this threshold amplitude value may be reduced. The parameters may take on various values which can be dependent upon the environment of the NVCD headset. For example, 0 can correspond to a typical office environment, 1 may correspond to call center applications, and 2 may be for other audio environments. The default parameter may be 0.
3. Transmit Expansion Threshold for Handset: This parameter may represent the noise floor for audio amplitude received through an NVCD handset, which may be below the level for ordinary speech. Audio signals below this threshold amplitude value may be reduced. The parameters may take on various values which can be dependent upon the environment of the NVCD handset. For example, 0 can correspond to a typical office environment, 1 may correspond to call center applications, and 2 may be for other audio environments. The default parameter may be 0. The transmit expansion threshold for a handset may have the same values as the transmit expansion threshold for a headset.
4. Headset Transmit Gain: This parameter corresponds to the amount of amplification gain which is put on the transmitted voice signal. For example, this value ma have a default of 0 for normal conditions, a 1 for a +6 dB of gain, and 2 corresponding to −6 dB of gain.

The audio control parameters may be explicitly set by an administrator who may edit the settings file corresponding to a specific environment. If a value is not specifically set, the default value may be used by the NVCD.

The audio control parameters in the settings file 210 may control various aspects of the audio processing algorithm, which may include:

1. Audio Environment Selection: a control parameter which is associated with a combination of specific values for each of the audio processing parameters. This parameter corresponds to a specific audio environment, and, for example, may take on an integer value which corresponds to an index into a data structure 225 of audio processing parameters (e.g., this parameter may take on a value ranging from 0-191, with zero being the default value).
2. Audio Sidetone for Headset: controls the amplification for the sidetone of a headset. This value may correspond to the amplitude of an audio feedback signal which is provided to an NVCD user's headset when they are talking to their connecting party. This feedback is used to provide the user with a more natural communications experience and so that the user may monitor their own voice through the headset. This parameter may take on, by way of example only, a value of 0 (may be the default), 1 (corresponding to 6 dB attenuation), 2 (corresponding to infinite attenuation which implies no sidetone).

3. Audio Sidetone for Handset: controls the amplification for the sidetone of a handset. This value may correspond to the amplitude of an audio feedback signal which is provided to an NVCD user's handset when they are talking to their connecting party. This feedback is used to provide the user with a more natural communications experience and so that the user may monitor their own voice through the handset. This parameter may take on, by way of example only, a value of 0 (may be the default), 1 (corresponding to 6 dB attenuation), 2 (corresponding to infinite attenuation which implies no sidetone).

One of ordinary skill in the art would appreciated that the specific audio control and processing parameters described above, along with their illustrative values, are provided as examples only, and other parameters could be used in the context of various other embodiments of the invention.

Figure 3:
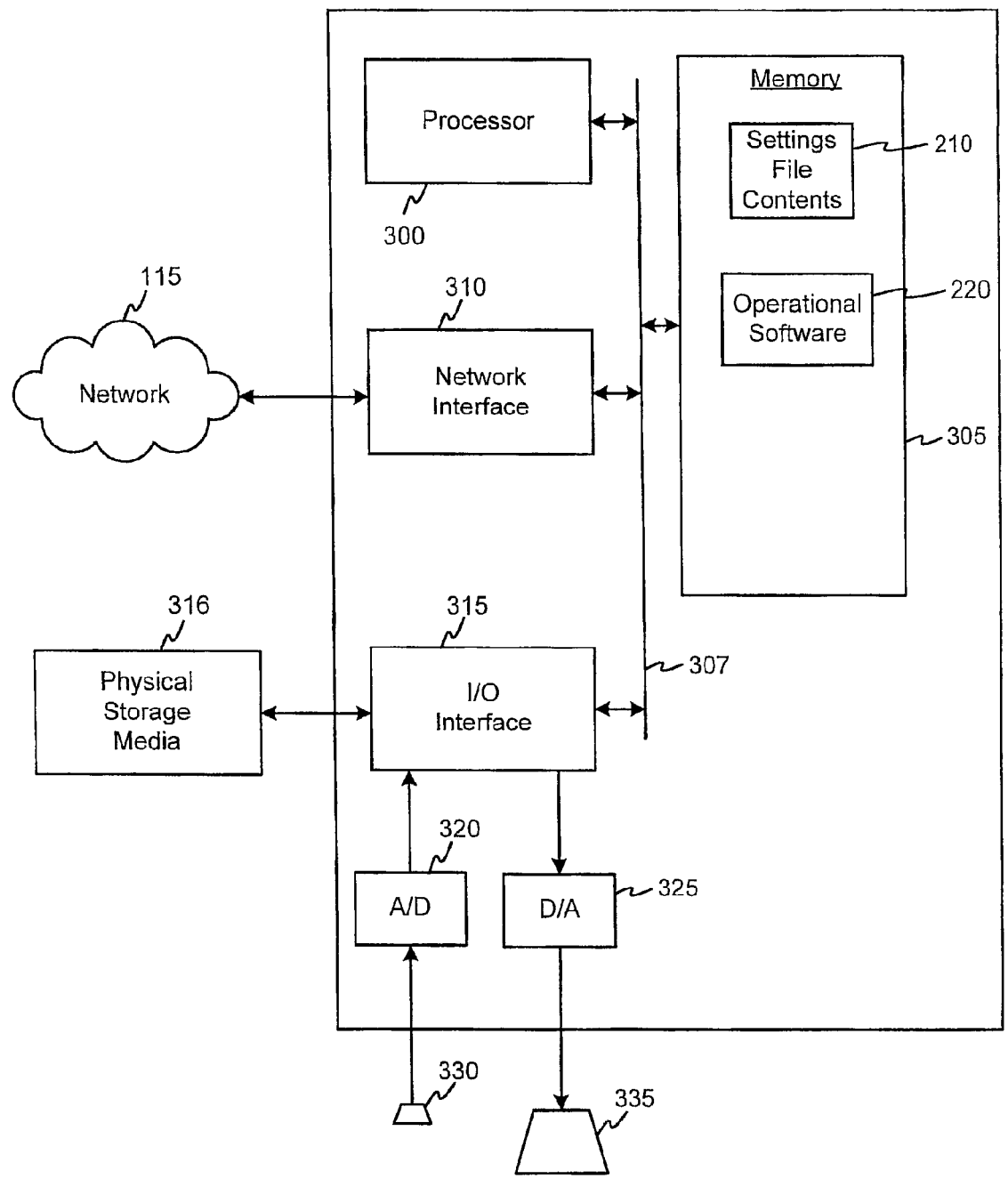
FIG. 3 depicts a block diagram of an exemplary networked voice communications device.

FIG. 3 depicts an exemplary block diagram of a Networked Voice Communications Device (NVCD) 110x consistent with another embodiment of the invention. The NVCD 110x may include a processor 300, a network interface 310, and a memory unit 305, where each may be interconnected via an interface bus 307. The processor 300 may include a general-purpose processor (such as, for example, x86 processors by Intel and/or AMD) and/or Digital Signal Processing units. Other embodiments may include more than one physical processor and/or a multi-core processor. The processor 300 may operate on digital voice signals and control the NVCD 110x using instructions and parameters stored in memory unit 305. The memory may be non-volatile RAM, a hard disk, or any other type of appropriate storage media known in the art. The content of the memory unit will be described in more detail below. The NVCD 110x may further include an I/O interface 315, connected to processor 300 via the interface bus 307. The I/O interface 315 may provide an interconnect between various physical storage media (such as optical media or solid state media known in the art). The I/O interface 315 may also be interfaced with an A/D unit 320 and a D/A unit 325. The A/D unit 320 may be further coupled to a microphone 330, and the D/A unit 325 may be further coupled to a speaker 335.

Operation of the NVCD 110x may take place as follows. Voice input provided by a user may be converted to an electrical signal by the microphone 330, and may be digitized by the A/D 320. The digitized voice signal may be carried by the I/O interface 315 to the processor 300 for various coding and processing functions, and may be subsequently sent through network interface 310 for network processing so the processed voice signals may be prepared for communications with other party/parties over network 115. The processing functions can include audio processing based upon one or more of the audio control parameters in the settings file 210, and one or more of the audio processing parameters 225 hard coded in the operational software 220. The audio processing module 227, which may be located within the operational software, can process the digital voice signals using algorithms which are known in the art. The networking processing performed by the network interface 310 may involve network processing such as packetizing and addressing of data using techniques known in the art.

Incoming encoded digital voice signals may come over the network 115, via network interface 310, from other the NVCDs within the network 115 (and possibly other devices external to, but functionally coupled, to network 115), and pass through the network interface 315 to the processor 300, where the signals may be decoded and further processed, and sent to the I/O interface 315. The processing functions for the incoming signals may also include audio processing based upon one or more of the audio control parameters in the settings file 210, and one or more of the audio processing parameters using algorithms known in the art. The I/O interface 315 may pass the decoded digital voice signals to the D/A converter 325, where the digital signal may be converted to an analog voice signal. The analog voice signal may then be played through the speaker 335 so the user may hear other party/parties being in the conversation.

The network interface 310 also allows the NVCD 110x to communicate with the server 105 for configuration, administration, and maintenance functions. The NVCD 110x may download the operational software from the server 105 when the NVCD 110x is initialized. This initialization may be performed when the NVCD 110x is powered, and/or when some other initialization command is issued. The initialization command could be entered by the user through a switch or via a keypad, and/or may issued remotely by the server 105. The settings file 210 may also be provided to the NVCD 110x over the network 115 from the server 105. This may occur based upon a remote command issued from the server 105, or may be initiated locally by the NVCD 110x user. Local initiation may be accomplished by powering the NVCD 110x and/or issuing a command. The command may be entered by a switch or a keypad, or other user input device. Alternatively, the settings file 210 may be provided to the NVCD 110x on the physical storage media 316 through the I/O interface 315.

The memory unit 305 may store a variety of instructions and parameters which may include the operational software 220 and the contents of settings file 210. An interpreter (not shown) may also reside in memory unit 305 which provides instructions for interpreting script files; alternatively, the interpreter may reside in on-board memory within the processor 300 itself. The memory unit 305 may also contain a network address of the server 105 which is used to find a server upon the NVCD's initialization. Audio control parameters 210 may be available to the Management Information Base (MIB). The MIB may be a collection of hierarchically organized information which may stored in the memory unit 305. The information stored in the MIB can be organized in a tree-like structure which may contain objects describing information regarding the NVCD. The objects may have associated object identifiers to provide efficient access to information stored within the MIB. The MIB may be accessed using network management standards defined under the Simple Network Management Protocol (SNMP).

The NVCD 110x may be any type of networked voice communications device known to one of ordinary skill in the art. For example, the NVCD 110x may be a VoIP telephone, such as, for example, an Avaya 46xx or 96xx unit. Alternatively, the NVCD 110x may be a software module (e.g., a soft-phone) running on a computer (e.g., a laptop, desktop, workstation, server, etc.). The NVCD 110x may be a portable device, such as, for example, a PDA, possibly in conjunction with a headset, or multi-function cellular telephone, a desktop handset, other wireless radio-telephones, or other devices using WiFi 801.11x or any other switched packet network known to one of ordinary skill in the art. One of ordinary skill in the art would appreciate that various embodiments of the invention described herein may also be utilized for networked communication devices transferring video and/or still image information, either alone or in combination with voice information.

Figure 4:
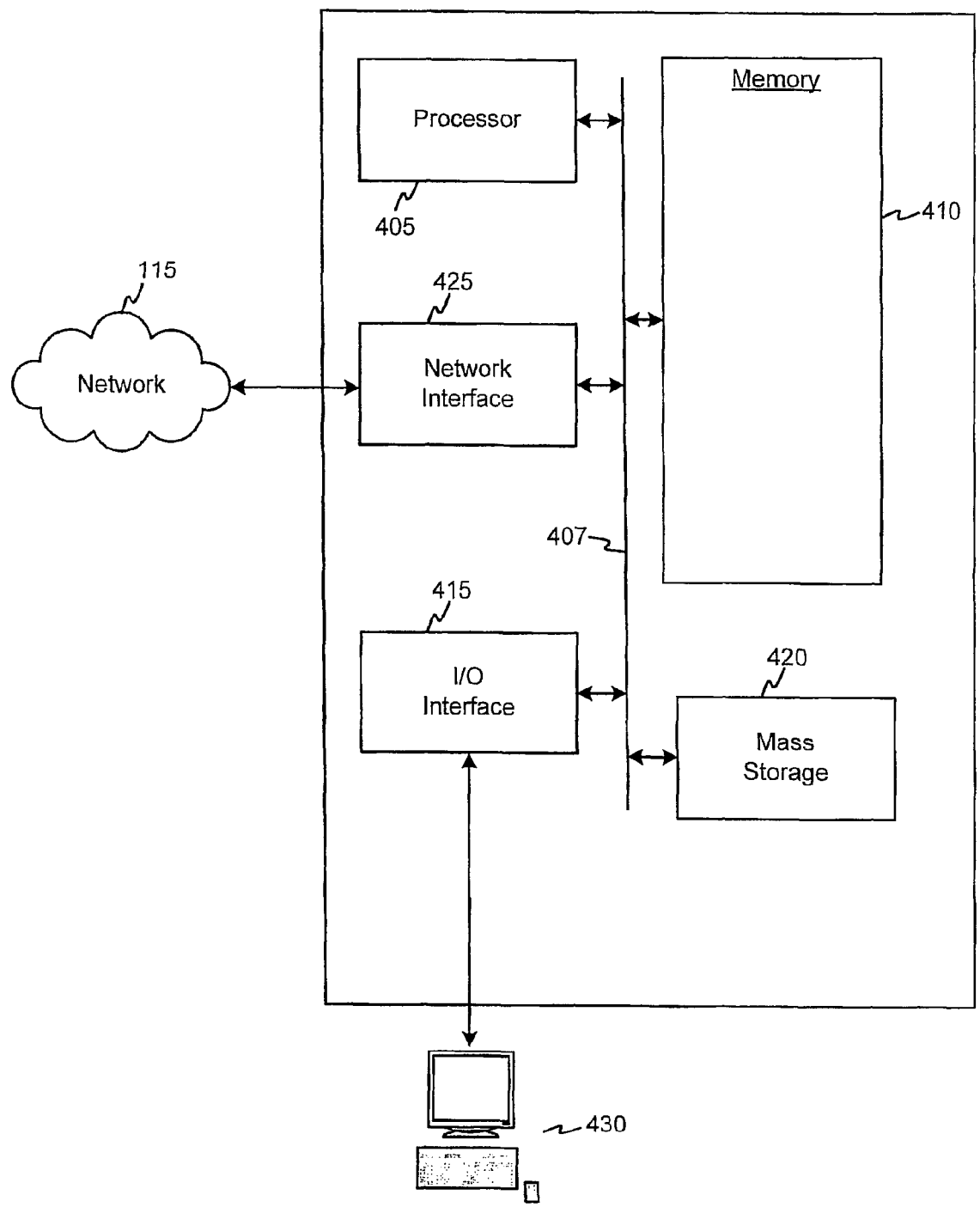
FIG. 4 shows block diagram of an exemplary server.

FIG. 4 shows a block diagram of a server 105 consistent with another embodiment of the invention. The server 105 may include the processor 405, a system bus 407, a mass storage unit 420, an I/O interface 415, a memory unit 410, and a network interface 425. The processor 405 may interface with memory 410 and the mass storage unit 420 via the system bus 407. The memory 410 and/or the mass storage unit 420 may contain executable instructions and data for implementing various operations for the NVCS 100, including maintenance, administration, and configuration functions of the NVCDs 110a-110n. The network interface 425 may interface with the processor 405 over the system bus 407, and can provide an interface for communication with external devices, such as the NVCDs 110a-110n, over the network 115. The I/O interface 415 may be provided to permit a user to interface to the server 105 via user interface 430.

One of ordinary skill in the art would appreciate that the server 105 may be any type of computer utilizing any operating system. For example, the processor 405 may be an x86 based CPU, and utilize any variant of the Unix and/or Linux operating system, further using, for example, the Perl scripting language for creating scripts which may be used for the settings file 210. Alternatively, the server 105 may be implemented as special purpose hardware which may be useful for technicians and/or administrators configuring/maintaining the NVCS 100. The server 105 may run commercial and/or specialized software for operation/maintenance of the NVCS 100. One example of such software may be Communications Manager (CM) by Avaya.

Figure 5:
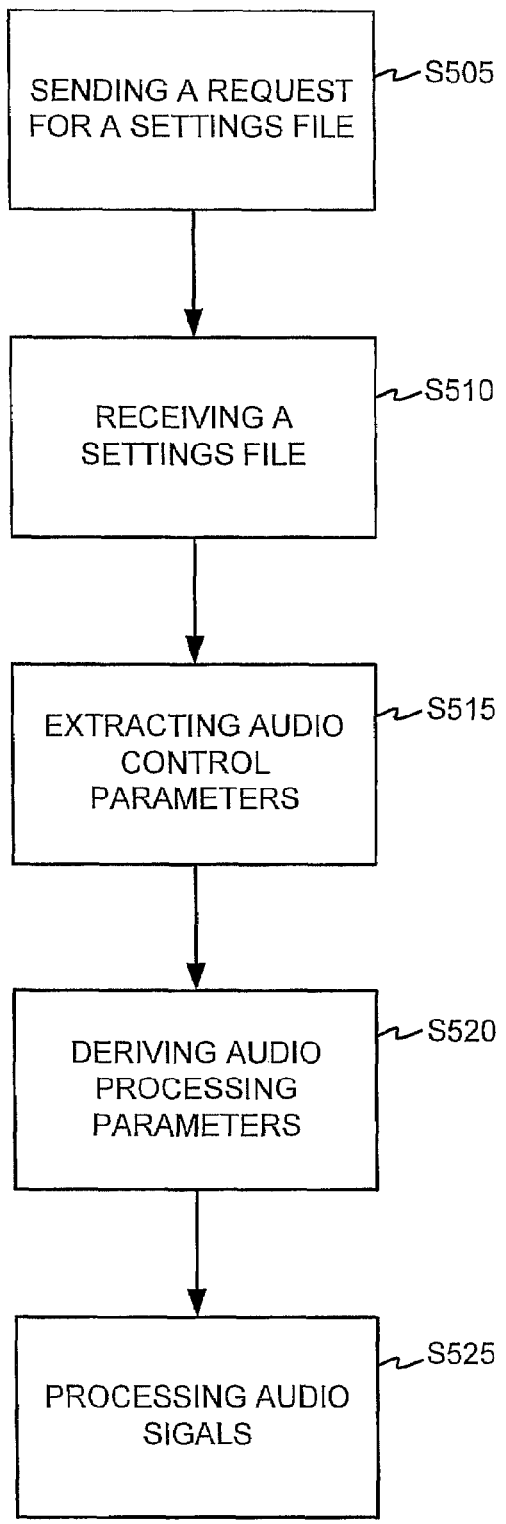
FIG. 5 depicts a flow diagram for an exemplary process which can be associated with the networked voice communications device.

FIG. 5 depicts a flow diagram for an exemplary process which can be associated with the networked voice communications device. The process may include the NVCD 110x sending out a request for a settings file 210 (S505). This request may occur when the device is initialized by being powered on from an off state, or it may occur when the user issues a specific command to the NVCD. The memory unit 305 within the NVCD 110x may have a network address of the server 105 pre-stored to direct the request to a specific machine. The NVCD 110x may receive the settings file 210 from the server 105 in step S510 over the network 115. The settings file 210 may be a script or data file that can be specifically customized to a selected NVCD. Alternatively, the settings file may be provided to the NVCD 110x using a physical storage media 316 via the I/O interface 315. Once the settings file 210 is received, the processor 300 may perform operations on the settings file to interpret and/or extract and decode the audio control parameters which may be contained therein (S515). The processor 300 may utilize one or more audio control parameter to derive audio processing parameters (S520). For example, it may be performed by using at least one audio control parameter as an index into a data structure 225. As previously discussed above, the data structure may reside in the memory 305, and further may be hard-coded into the operational software 220. Once the audio parameters are determined in S520, the NVCD 110x may process the transmitted and received audio signals in a manner which optimizes the audio quality for the specific NVCD (S525). The processing is done in accordance with the NVCD 110x specific hardware configuration and the environment in which it is placed. Both the audio processing parameters, and one more of the audio control parameters, may be used by the audio processing algorithms on board the NVCD 110x. If various audio control and processing parameters are not provided, not properly presented, or not properly decoded, the NVCD 110x can perform audio processing using default audio control and processing parameters as specified in the operational software 220.

Figure 6:
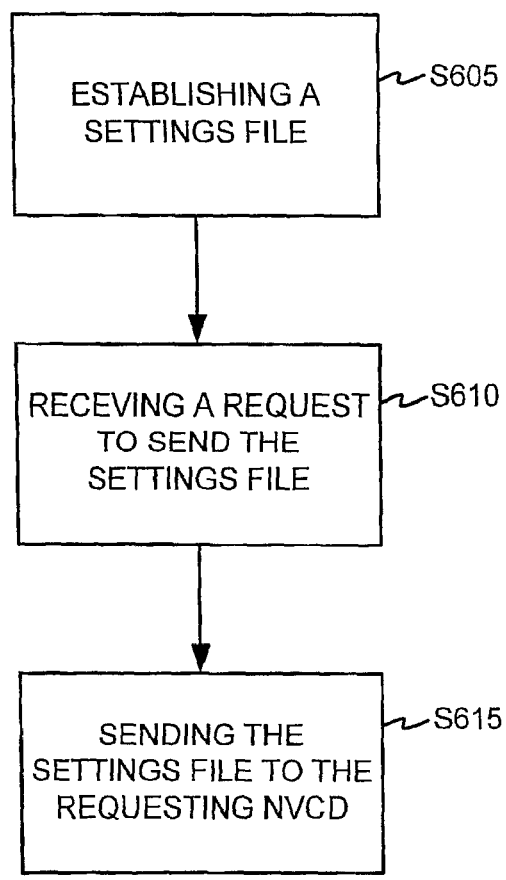
FIG. 6 shows a flow diagram for an exemplary process which may be associated with the sever.

FIG. 6 shows a flow diagram for an exemplary process which may be associated with the sever 105. A settings file 210 may be established at the server 105 (S605). Because the settings file 210 may be a human readable file, it may be easily modified and/or created by an administrator using any text editor known to one of ordinary skill in the art. By selecting the appropriate audio control parameters in the settings file 210, the NVCD's 110a-110n audio characteristics can be set to optimize the audio quality for each user. One of ordinary skill in the art would appreciate that optimizing the audio characteristics of an NVCD may be a trial-and-error process, which could take a number of iterations before an NVCD's audio quality is acceptable to the user, and therefore the ability to easily modify the settings file 210 can facilitate the process of optimizing the NVCD's audio quality. The server 105 may receive a request from the NVCD 110x to send the settings file 210 to the NVCD 110x (S610). Once the request is received, the server 105 may send the settings file to the NVCD 110x (S615). Alternatively, an administrator may push the settings file to the NVCD 110x.

Although detailed embodiments and implementations of the present invention have been described above, it should be apparent that various modifications are possible without departing from the spirit and scope of the present invention.

What is claimed is:

1. A method for setting the audio parameters of a networked voice communications device, comprising:
   receiving a settings file;
   extracting at least one audio control parameter from the settings file;
   deriving audio processing parameters based upon a value selected from the at least one audio control parameter; and
   controlling the audio characteristics of the networked voice communications device using the audio processing parameters and the at least one audio control parameter.

2. The method according to claim 1, further comprising:
   extracting at least one first audio control parameter from the settings file;
   extracting a second audio control parameter from the settings file;
   controlling at least one first audio characteristic directly based upon the at least one first audio control parameter;
   associating a plurality of audio processing parameters with the second audio control parameter; and
   compensating for the operating environment of the networked voice communications device based directly upon the audio processing parameters.

3. The method according to claim 2, wherein the first audio control parameters include a headset sidetone control and a handset sidetone control, and the second audio control parameter is a parameter associated with the operating environment of the networked voice communications device.

4. The method according to claim 2, wherein the audio processing parameters include automatic gain control dynamic range, a transmit expansion threshold for a headset, a transmit expansion threshold for a handset, and a headset transmit gain.

5. The method according to claim 2, wherein the audio processing parameters are pre-stored within the networked voice communications device as a matrix which is indexed in one dimension by the second audio control parameter.

6. The method according to claim 1, further comprising:
   initializing the networked voice communications device;
   identifying a server on a network; and
   sending a request to the server for providing the settings file.

7. The method according to claim 6, wherein the initializing occurs automatically when the networked voice communications device is powered, or is initiated manually by user command.

8. The method according to claim 1, wherein the settings file is a human-readable text file.

9. The method according to claim 8, wherein the settings file is a script file or a data file.

10. The method according to claim 1, wherein the networked voice communications device is a Voice over Internet Protocol (VoIP) telephone.

11. A method for providing audio parameters to a networked voice communications device, comprising:
   establishing a settings file which includes at least one audio control parameter;
   receiving a request to send the settings file; and
   sending the settings file over a network to the networked voice communications device.

12. The method according to 11, wherein the settings file further includes at least one first audio control parameter which directly controls at least one first audio characteristic, and a second audio control parameter which is associated with the operating environment of the networked voice communications device.

13. The method according to 12, wherein the first audio control parameters include a headset sidetone control and a handset sidetone control, and the second audio control parameter is associated with audio processing parameters stored within the networked voice communications device.

14. The method according to claim 13, wherein the audio processing parameters include automatic gain control dynamic range, a transmit expansion threshold for a headset, a transmit expansion threshold for a handset, and a headset transmit gain.

15. The method according to claim 11, wherein the settings file is a human-readable text file.

16. The method according to claim 15, wherein the settings file is a script file or a data file.

17. The method according to claim 11, wherein the networked voice communications device is a Voice over Internet Protocol (VoIP) telephone.

18. A networked voice communications device having audio characteristics configured by a settings file, comprising:
   a processor; and
   memory, functionally coupled to the processor, having executable instructions for causing the processor to
   receive the settings file,
   extract at least one audio control parameter from the settings file,
   derive audio processing parameters based upon a value selected from the at least one audio control parameter, and
   control the audio characteristics of the networked voice communications device using the audio processing parameters and the at least one audio control parameter.

19. The networked voice communications device according to claim 18, wherein the memory further contains instructions for causing the processor to
   extract at least one first audio control parameter from the settings file,
   extract a second audio control parameter from the settings file,
   control at least one first audio characteristic directly based upon the at least one first audio control parameter,
   associate a plurality of audio processing parameters with the second audio control parameter, and
   compensate for the operating environment of the networked voice communications device based directly upon the audio processing parameters.

20. The networked voice communications device according to claim 19, wherein the first audio control parameters include a headset sidetone control and a handset sidetone control, and the second audio control parameter includes a parameter associated with the operating environment of the networked voice communications device.

21. The networked voice communications device according to claim 19, wherein the audio processing parameters include automatic gain control dynamic range, a transmit expansion threshold for a headset, a transmit expansion threshold for a handset, and a headset transmit gain.

22. The networked voice communications device according to claim 19, wherein the audio processing parameters are pre-stored in the memory within the networked voice communications device as a matrix which is indexed in one dimension by the second audio control parameter.

23. The networked voice communications device according to claim 18, wherein the memory further contains instructions for causing the processor to
   initialize the networked voice communications device;
   identify a server on a network; and
   send a request to the server for providing the settings file.

24. The networked voice communications device according to claim 23, wherein the initializing occurs automatically when the networked voice communications device is powered, or is initiated manually by user command.

25. The networked voice communications device according to claim 18, wherein the settings file is a human-readable text file.

26. The networked voice communications device according to claim 25, wherein the settings file is a script file or a data file.

27. The networked voice communications device according to claim 18, wherein the networked voice communications device is a Voice over Internet Protocol (VoIP) telephone.

28. A method for setting the audio parameters of a networked voice communications device, comprising:
   receiving a settings file at the networked voice communications device;
   extracting first and second audio control parameters from the settings file;
   setting a plurality of audio processing parameters based upon said first audio control parameter; and
   controlling the audio characteristics of the networked voice communications device using the second audio control parameter and said plurality of audio processing parameters.

29. The method according to claim 28, wherein the networked voice communications device is a Voice over Internet Protocol (VoIP) telephone.

* * * * *